United States Patent [19]

Pence

[11] Patent Number: 4,876,662

[45] Date of Patent: Oct. 24, 1989

[54] OPTIMIZING VOLUME MOUNTS IN A MULTIDRIVE ENVIRONMENT

[75] Inventor: Jerry W. Pence, Tucson, Ariz.

[73] Assignee: International Business Machines Corporation, Armonk, N.Y.

[21] Appl. No.: 188,880

[22] Filed: May 2, 1988

[51] Int. Cl.$^4$ .................................................. G06F 12/00
[52] U.S. Cl. .................................... 364/900; 364/952; 364/952.1; 364/952.4; 364/968
[58] Field of Search .................... 364/200, 300, 900; 360/48, 109

[56] References Cited

U.S. PATENT DOCUMENTS 4,389,689 6/1983 Sims, Jr. .............................. 360/109
4,814,903 3/1989 Kulakowski et al. ................ 360/48

OTHER PUBLICATIONS

*IBM Technical Disclosure Bulletin*, vol. 24, No. 2, Jul. 1981, Kamionka, "Shared Resource Management", pp. 1051–1052.

*IBM Technical Disclosure Bulletin*, vol. 26, No. 2, Jul. 1983, Kamionka, "Recalling Data in a Distributed Processing System", pp. 463–464.

*IBM Technical Disclosure Bulletin*, vol. 26, No. 3A, Aug. 1983, "User Controls During Tape End-of-Volume Processing", Beglin et al., pp. 1303–1305.

*IBM Technical Disclosure Bulletin*, vol. 26, No. 3B, Aug. 1983, Kamionka et al., "Limited Replacement and Migration Controls", pp. 1746–1747.

*Primary Examiner*—Raulfe B. Zache
*Attorney, Agent, or Firm*—H. F. Somermeyer

[57] ABSTRACT

Mounting volumes (tape reels or disks) to data processing system is managed for reducing the number of mounting operations. A data accumulation algorithm generates mounting criteria.

7 Claims, 1 Drawing Sheet

OPTIMIZING VOLUME MOUNTS IN A MULTIDRIVE ENVIRONMENT

FIELD OF THE INVENTION

The present invention relates to data processing, particularly to the management of peripheral devices and associated mountable record media in a data processing environment.

DISCUSSION OF THE PRIOR ART

Data storage in data processing environments typically is viewed as a hierarchy of storage levels. The first or fastest level is the level that communicates directly with the host processors in the data processing environment. The lower levels of the hierarchy which may be up to six, seven or eight levels, add increasingly larger data storage capacities but have increasingly longer accesss times. The lower levels of the storage hierarchy are often characterized by a plurality of individually addressable data storage devices. It is desired to utilize these various addressable data storage devices in an optimum manner for enhancing the overall operation of the data processing environment and particularly the data storage hierarchy.

Depending on how a data storage hierarchy is defined, the various levels can include the following types of devices and apparatus. The highest level may be a caches directly connected to the hot processor electronic circuits. The next level can be the so-called "main memory" which, in a large processor, can be several megabytes of data storage. Just below the main memory can be relatively fast access disk storage devices, also referred to as direct access storage devices (DASD) or an electronic memory designed to emulate a magnetic data storage drum, DASD and the like. The fourth level can consist of slower DASDs than that used in the third level. Below the slower DASDs can be magnetic tape, optical disks, etc. Yet below that level can be tape or disk data libraries which are for archival storage and the like. It is to be understood that the various levels can be defined in differing manners and be constituted by various and diverse devices. A lowest level, for example, can include a communication for transferring data from a data processing environment to an archival environment remotely located from the data processing environment. Another device within a data storage form of hierarchy is a so-called "cached DASD" wherein a electronic memory is logically interposed between the main memory of a host processor and the relatively high performance DASD.

In any data storage hierarchy it is desired to move data as quickly as possible from a higher level to a lower level such that the higher levels have available data storage capacity for storing data that will be next used by the host processor or for providing data storage space for data generated by the host processor. This type of control can take many forms. In a cached DASD for example, a least recently used (LRU) algorithm is used for moving data from the electronic cache to the DASD. An example of such an arrangement is shown by the Hartung et al., U.S. Pat. No. 4,636,946. Hartung et al. teach that in addition to the usual LRU listing (as shown in FIG. 4 of this reference) two thresholds are provided for more efficiently demoting or migrating data from the electronic memory cache to the DASD. The lower threshold is an availability threshold "AT" under which the processor in a control unit controlling the cache and DASD scans the LRU for candidates to be demoted from the cache to the DASD. When a data candidate is found, then the scan of the LRU list proceeds to a second threshold, a so-called "grouping threshold" (GT). The second scan looks for those data stored in cache that are in the same addressable module of DASD as that candidates found in the first scan. In DASD, the group is termed a "cylinder" which typically can have up to seventeen tracks of data. The minimum demotable unit is a track; up to seventeen tracks can be grouped together for a single access to DASD. By limiting the number of accesses to DASD, a migration from cache to DASD tends to be optimized.

In a magnetic tape environment, a single volume is mountable and demountable from a magnetic tape recorder. Where a manual library is involved, time required to manually mount and demount a tape volume (one reel of tape) can be exceedingly long when measured with respect to data processing speeds. Even in an automatic tape library, the access time to tape volume is measured in seconds rather than in microseconds or milliseconds, hence, it is relatively long with respect to the time base of a data processing environment. Accordingly, it is desired to minimize the number of such mounts for making data transfers into and from tape volumes more efficient. The same device applies to data libraries employing data storing disks. This arrangement is similar to the Hartung et al. philosophy of grouping together a set of spatially related data sets or tracks which are storable within a single group of data storage area, such as a cylinder, tape volume and the like.

The Hartung et al. patent teches control for migration or demotion of data through a lower level of the data storage hierarchy wherein the data storage area is relatively accessible for storage and retrieval. When demountable media are involved, including demountable optical disks, magnetic disks and magnetic tape, such a luxury disappears. This means that a more effective management of the data storage hierarchy, with respect to volume mounting, is desired. An IBM program product called data facility/hierarchical storage manager (DFHSM) provides for migration and backup of data storage from a primary level of peripheral devices, typically DASD, to a secondary level. The secondary level can be magnetic tape, tape libraries or slower DASDs. This program product sends messages to an operator console, or tape library for mounting and demounting tape volumes. The mounting of tape volumes for migration is not optimized for filling each mounted tape volume with data for minimizing the number of tape volume mounts. It is desired to increase the efficiency of media volume mounting for operating the data storage hierarchy, hence, the data processing environment.

SUMMARY OF THE INVENTION

It is an object of the present invention to provide a management of data storage volume mounting in a data storage hierarchy which enhances the overall operation of the hierarchy in providing for optimal storage of data.

In accordance with the invention, a record medium volume is mounted for being accessed by a host processor for receiving data to be stored in accordance with predetermined criteria. In a first one of such predetermined criteria, whenever the amount of data that has been accumulated in the data processing environment which at least equals the data storage capacity of a volume to be mounted actuates the system to mount a record volume. An additional requirement for record medium mounting can include a minimum elapsed time has occurred, or a minimum number of data sets have been identified, then a volume candidate is mounted on a typical recorded for receiving data to be destaged or migrated to that volume. In second ones of predetermined criteria, a record medium volume is mounted whenever a maximum elapsed time has occurred since the last migration release stage, a maximum number of data sets (also called requests) have been identified and accumulated in the data processing environment or an explicit request for a volume mount for one reason or another has been generated in the data processing environment.

The foregoing and other objects, features, and advantages of the invention will be apparent from the following more particular description of preferred embodiments of the invention, as illustrated in the accompanying drawings.

DESCRIPTION OF THE PREFERRED EMBODIMENT

Figure 1:
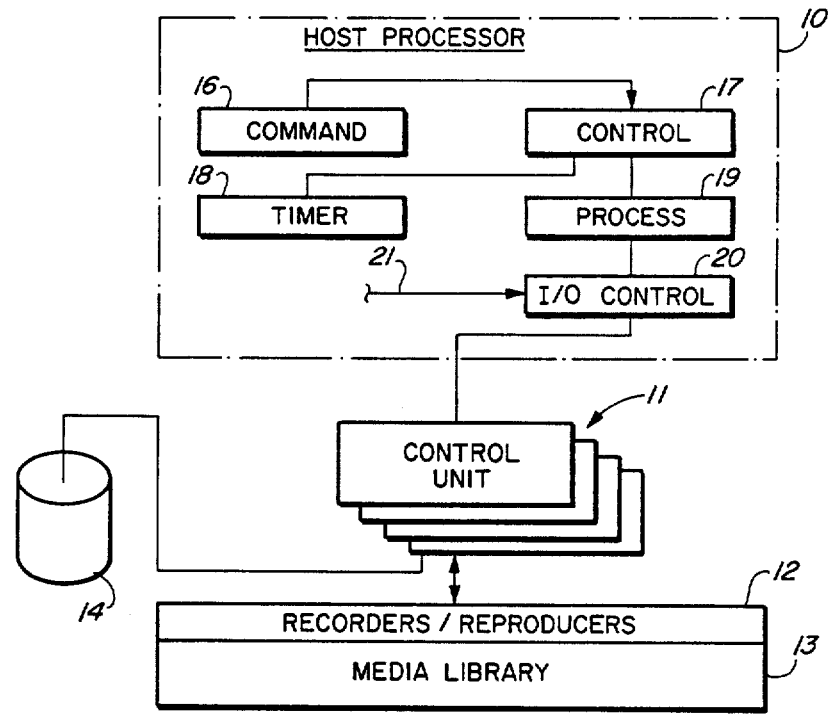
FIG. 1 is a simplified block diagram of a data processing environment which includes a data storage hierarchy.

Referring now more particularly to the drawing, like numbers indicate like parts and structural features in the drawing. A data processing environment includes one or more host processors 10 having a set of peripheral subsystems 11, many of which can be data storage subsystems. Such of the data storage subsystems includes a plurality of control units, as is well known. Attached to some of the control units are DASD collectively and diagrammatically designated by numeral 14. Such DASD may constitute a primary peripheral data storage level of the data storage hierarchy. Associated with such DASDs 14 may be a set of caches (not shown) within the respective control units. The combination of a DASD 14 and a cache in the control unit provides for enhanced peripheral subsystem operation for enhancing host processor 10 computation. Another of the peripheral subsystems includes a set of recorders/reproducers 12 which are adapted to receive removable media. Such recorders/reproducers include magnetic tape devices, magnetic disk devices with removable media, and optical disks with removable media. Associated with a set of the recorders/reproducers 12 is a media library 13 which can be manually controlled, such as is commonly practiced with magnetic tape libraries, or may be an automatic library of known design. Such an automatic library can include the IBM 3850 Mass Storage System (MSS) which has tape cartridges mountable on recorders/reproducers for providing data communication between the volumes of data and a host processor.

Each host processor 10 includes complex electronic circuits and computer programs for computation and data processing system control. Such programs can include DFHSM, supra. As a portion of DFHSM are other programs which manage data storage hierarchies. Program modules are included as shown in FIG. 1 for incorporating the practice of the present invention in such a data processing environment. A command module 16 is a program task which receives software commands from other programs (such as DFHSM) in the host processor 10. Such commands are decoded and transferred to control task 17. Control task 17 implements the logic of the present invention for determining when a volume to receive data is to be mounted in one of the recorders/reproducers 12. In order to implement the logic, a software timer task 18 is software attached to control task 17. The timer task 18 indicates a calculated time of day. From this calculated time of day, various elasped times are calculated by control 17 in a usual manner. Such elasped times include task execution times, since a record medium volume was last mounted, etc. Processor task (process) 19 is software attached to control task 17 and processes the results of the logic determination made by the control task. Results of that processing by task 19 results in messages being sent through another software attachment to I/O control program 20, which sets up channel programs and provides generally for input/output operation control between host processor 10 and the various peripheral subsystems. In IBM host processors the I/O control is called "IOS" (input/output system). Of course, the I/O control 20 receives other I/O commands and messages from various programs within the host processor 10, all as diagrammatically illustrated by arrow 21.

Figure 2:
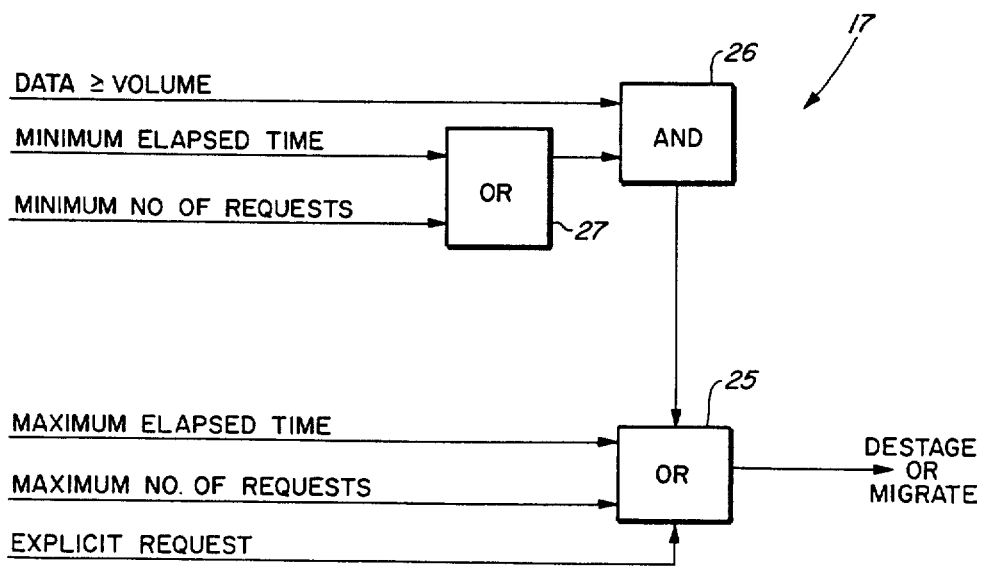
FIG. 2 is a simplified logic diagram illustrating the logic of operations of the FIG. 1 illustrated host processor control for the mounting of data storage volumes in a data storage hierarchy for the destaging or migration of data into a mounted volume.

The logic of operations of control task 17 for implementing the present invention is shown in FIG. 2. Software logic OR circuit 25 passes any one of four software conditions for initiating a destage or migrate operation; for example, mounting a data record medium for receiving and storing data signals. Any one of the four software determined conditions of host 10, and explicit request by an application program, the number of requests for migration or destage has reached a predetermined maximum number of such requests, a maximum elasped time since the last data record medium was mounted has been reached or data accumulated within host 10 for destage or migration is sufficient to fill one data record volume. It may be desired to limit the data record volume mountings more severely than set forth above. In such a situation, logic AND function 26 is logically interposed between the data > volume capacity software input and logic OR function 27. Logic OR function enables the AND function 26 each time either of two additional software determined conditions are established. A first of the additional conditions is that a minimum time has elasped since the previous data record volume was mounted; i.e., the frequency of volume mounts is to be limited. A second of the additional conditions is that a minimum number of requests for destage or migration have been accumulated in control 17 before a data record volume(s) is to be mounted. Such frequency limitation on mounting or accessing a record medium can be applied to any or all of the stated conditions which are inputs to logic OR 25. It is to be appreciated that the accumulation of the software input conditions is established using current software techniques of measuring elapsed time, counting requests and summing the amount of data to be transferred. Since such software activities are well known and understood, they are not separately described herein.

The flowcharts for the command processing is listed below. The flowchart consists of three modules, one the STOP command, which stops the system and hence the optimize mounting processing, a BACKUP command and a SETSYS command which supplies control parameters to the optimize mounting.

```
STOP COMMAND
The control task for Optimized Mounting will be posted to
flush all its queued output, mount tape volumes as needed
and shut down whenever a system STOP command is processed.
END STOP COMMAND
BACKUP COMMAND
The BACKUP command is one of many that can create data to be
handled by Optimized Mounting. A START_OUTPUT option
may be specified on these commands if they are not waiting for
the request to be processed.
The START_OUTPUT option causes the Optimized Mounting
control task to be posted to begin processing immediately.
END BACKUP COMMAND
SETSYS COMMAND
The SETSYS command has an OPTIMIZED_MOUNT
parameter with optional subparameters as follows
-START_OUTPUT
-causes Optimized Mount processing to be posted to begin
processing immediately
-MAX_DELAY, MAX_#_Q'ed, %_FULL, UNITNAME,
MINIMUM_TIME, MINIMUM_#_REQUESTS
-causes Optimized Mount processing to be posted to change
the control parameter setting to the specified value
(UNITNAME is capable of being mapped to a cartridge
capacity)
END SETSYS COMMAND
CONTROL TASK
The control task includes two portions; an initialization
portion and a loop portion. The loop is performed substan-
tially continuously when the host processor 10 through its
dispatcher or other program control mechanism allows the
volume optimizing task to perform its program functions.
Initialization
-Set up ECB list of 5 entries
-Set default control parms(max_delay, unitname, %_full,
max_#_Q'ed)
-Calculate amount_thrshld from unitname & %_full
-Attach TIMER task
Loop - DO FOREVER
-SELECT(ECB)
-CASE(Request received)
-Calculate amount of data in new request & add to
amount_Q'ed.
-Increment by one the #_of_requests queued.
-Append request to Req-Q (double threaded chain with head
& tail ptr)
-Get current time of day (TOD) & put in request entry as
TOD queued.
-IF (amount_Q'ed => amount_thrshld AND minimum time has
elapsed AND minimum_#_requests are queued) :
/* Threshold checks */
#_of_requests => max_#_Q'ed THEN
IF Process_flag = NOT_ACTIVE THEN
POST PROCESS
ELSE;
ELSE /* Thresholds
not exceeded */
IF exactly 1 entry & Process_flag = NOT_ACTIVE THEN
POST TIMER task (IN:SET, time_Q'ed +
Max_delay_value)
-CASE(Max delay timer expired)
-IF Process_flag = NOT_ACTIVE THEN
POST PROCESS
-CASE(Explicit request to start)
-IF request also supplied THEN
append request to Req-Q
-IF no requests Q'ed THEN
send nothing_Q'ed message
ELSE
IF Process_flag = NOT_ACTIVE THEN
POST PROCESS
-CASE(Shutdown request)
-IF Process_flag = NOT_ACTIVE THEN
-detach TIMER task
-RETURN to system
-CASE(Parm updates)
-IF unitname : %_full specified THEN
```

```
-continued
update amount_thrshld value
-IF minimum_time specified THEN
update minimum_time
-IF minimum_#_requests specified THEN
update minimum_#_requests
-IF max_#_Q'ed specified THEN
update max_#_Q'ed value
-IF unitname : %_full : max_#_Q'ed specified THEN
IF (amount_Q'ed => amount_thrshld AND minimum_time
has elapsed AND minimum_#_requests are queued) :
#_of_requests => max_#_Q'ed THEN
IF Process_flag = NOT_ACTIVE THEN
POST PROCESS
-IF max_delay specified THEN
update max_delay value & POST TIMER(IN:RESET)
IF Req_Q = NOT_EMPTY THEN
-get current time
-IF current time > (TOD 1st Req + max_delay) THEN
IF Process_flag = NOT_ACTIVE THEN
POST PROCESS
ELSE;
ELSE
POST TIMER(IN:SET, (TOD 1st Req + max_delay))
-END SELECT(ECB)
END DO FOREVER Loop of CONTROL TASK
END CONTROL TASK
```

The above charts' term ECB means "event control block", a software data unit. The UNITNAME identifies the address of the recorder/reproducer 12. Host processor 10 maintains a list within its I/O control 20, as is well known, of the data storage capacity of the volumes usable with UNITNAME. The %_FULL means what percentage of volume is defined as a full volume, i.e. when does identified data within host processor 10 equal the volume contents. As one example, a percent of a volume can be defined as a full volume. The term Q'ed means queued. MAX means maximum. ":" means OR. "#" means number.

The process task 19 is not detailed since it takes the information from the control task 17 and generates a socalled CCW chain, as is well known in IBM host processors. The constructed CCW chain is then supplied by process task 19 to the I/O control 20, as is done in the IBM computers.

```
TIMER TASK (IN:action, tod)
action - can have values of SET or RESET.
tod - is the time of day to set the timer to.
Initialization
-Set up ECB list of 2 entries
Loop - DO FOREVER
-WAIT on ECB list
-SELECT (ECB)
-CASE(SET)
-Issue STIMER for TOD, NOTIFY = @_of_WAKEUP
-CASE(RESET)
-Issue TTIMER to remove wakeup timer
-END SELECT
END DO FOREVER Loop of TIMER TASK
WAKEUP: asynchronously entered when timer expires
-POST control task that max_delay timer expired
-RETURN to system
END TIMER TASK
PROCESS TASK
-set PROCESS_FLAG = ACTIVE
-Loop through Q'ed request chain till all processed
-Reinitialize Q controls
-Chain head & tail ptrs = 0
-Amount_of data = 0
-#_of_requests = 0
-set PROCESS_FLAG = NOT_ACTIVE
END PROCESS TASK
```

While the invention has been particularly shown and described with reference to its preferred embodiments thereof, it will be understood by those skilled in the art that various changes in form and details may be made therein without departing from the spirit and scope of the invention.

What is claimed is:

1. In a machine-implemented method of operating a data storage system having a plurality of recorders/players for recording and reading data, each of the recorders/players for receiving and recording on and reading from record media;

the steps of:
measuring elasped time since data was received that is targeted to a record medium received in a given one of said recorders/players;
accumulating and measuring data to be transferred with respect to an unmounted record medium;
mounting an unmounted record medium in said given one recorder/player only after said accumulated and measured data reaches a first predetermined amount of said data.

2. In the machine-implemented method set forth in claim 1, further including the steps of:
setting a maximum elapsed time for mounting an unmounted record medium in said given one of said recorders/players; and
mounting said unmounted record medium in said given one of said recorders/players after expiration of said elapsed time since a request was received, irrespective of the amount of said accumulated data.

3. In the machine-implemented method of claim 2, further including the steps of:
counting a number of requests for accessing a given one of said unmounted record media; and
mounting said given one of the record media when the counted number reaches a second predetermined value irrespective of the accumulated data or elapsed time.

4. In the machine-implemented method of claim 3, further including the steps of:
determining the number of said requests, if said number of requests is not less than a third value which is less than said second value, then mounting the unmounted record medium, otherwise delay mounting the record medium until either the requests equal said second value or said elapsed time has reached said first predetermined value or said elapsed time has reached said first predetermined elapsed time while the accumulated data has reached a predetermined amount of data.

5. In the machine-implemented method of claim 4, performing all of the steps of the method in a host processor attached to the data storage system except the mounting of the record medium; and
causing the host processor to send a mount message to the data storage system for commanding mounting of the record medium whenever such mounting is required.

6. In a host processor attaching a data storage system having mountable record media;
data means for indicating a data record to be stored on a record medium including an indication of an amount of data;
timer means for measuring elapsed time since a last data record was mounted in the data storage system;
inventory means for accumulating indications of the amount of data stored in the host processor destined for storage on a mountable one of the record media;
request counting means for tallying a number of host processor requests for storing data on a mountable one of the record media;
threshold means indicating a minimum elapsed time, a given amount of accumulated data; a maximum elapsed time, a minimum number, and maximum number; and
analysis means coupled to the timer means, inventory means, counting means, and the threshold means for issuing a mount message to the data storage system to mount an unmounted record medium whenever (1) an accumulating indication indicates said given amount of data AND (said timer means indicates said minimum elapsed time OR said counting means indicates said minimum number of requests) OR (2) either said timer means indicates said maximum elapsed time or said counting means indicates a maximum number of requests.

7. In a machine-implemented method of operating a data storage system having a plurality of recorders for recording data onto a data record medium in any one of said recorders;
the steps of:
receiving a plurality of requests to record data onto a record medium;
counting the received requests and storing the count;
measuring time elapsed since a record medium last received data to be recorded;
receiving data to be recorded on a record medium and measuring the received data in terms of data storage space required on a record medium;
comparing said count with a predetermined threshold value and initiating recording on a record medium whenever said count exceeds said threshold value;
comparing said measured elapsed time with a predetermined threshold time and initiating recording on a record medium whenever said measured elapsed time exceeds said threshold time;
comparing said totalled data amount with a predetermined threshold data amount and initiating recording on a record medium whenever said totalled amount exceeds said predetermined threshold data amount; and
receiving an explicit request to immediately store given data on a record medium and initiating recording of the given date on a record medium upon receipt of such a request.

* * * * *